Patented Mar. 7, 1944

2,343,433

UNITED STATES PATENT OFFICE 2,343,433

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,124

19 Claims. (Cl. 252—326)

This invention relates to filtration and filters therefor and relates more particularly to filtration of lubricating oil of an internal combustion engine for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oil of internal combustion engines the dirt removal rate of filtering media may be sharply increased by contacting the oil to be filtered by the filtering media with a product of esterification between an hydroxylated drastically oxidized fatty body and a polybasic carboxylic acid, the fatty body being selected from the group consisting of unsaturated non-drying and semi-drying vegetable and animal fatty substances containing 8 to 32 carbon atoms. Such ester products may be added to the filtering medium in order to increase the dirt removal rate of the filtering medium or may be contacted in some other way with oil passing through the filtering medium. Preferably the ester product is used according to this invention by including it in a filter for use in the lubricating system of an internal combustion engine so as to provide an improved filter having a high dirt removal rate.

Polybasic carboxy acids which may be employed in the esterification reaction may be exemplified by phthalic, succinic, malic, fumaric, citric, citriconic, maleic, adipic, tartaric glutaric, diphenic, naphthalic, oxalic, or the like. The anhydrides of such polybasic carboxy acids such as phthalic anhydride, maleic anhydride, etc., are the equivalents of the acids and in some respects are even more advantageous than the acids in the production of esters. When reference is made to polybasic carboxy acids the anhydrides thereof are also included. Other suitable polybasic acids may be prepared by the diene synthesis, which involves condensation of alpha, beta unsaturated acids or anhydrides with compounds containing conjugated double bonds. For example, the condensation of maleic anhydride with alpha terpinene yields a dicarboxy acid which is suitable. Other polybasic carboxy acids may be prepared similarly by the diene synthesis reaction involving condensation of an alpha, beta unsaturated monocarboxy acid with a carboxy acid containing a conjugated double bond. For example crotonic acid may be condensed with abietic acid, which contains a conjugated double bond, to yield a dicarboxy acid suitable for use in the manufacture of ester products suitable for use in increasing the rate of dirt removal from lubricating oils in a filtering operation.

The drastically oxidized fatty body can be produced by subjecting an unsaturated non-drying or semi-drying vegetable or animal fatty oil or acid to conditions such that the fatty body becomes very highly oxidized. This is usually accomplished by subjecting the fatty body to blowing or other oxidizing conditions adapted to effect drastic oxidation.

The non-drying and semi-drying unsaturated fatty oils which may be drastically oxidized and esterified to produce an esterification product suitable for use in increasing the dirt removal rate of filtering media according to this invention may be exemplified by castor oil, soya bean oil, rapeseed oil, cottonseed oil, sunflower seed oil, corn oil, neat's foot oil and the like. These oils are to be distinguished from the drying oils such as linseed oil, tung oil, oiticica oil, poppyseed oil, perilla oil, and from the saturated non-drying oils and fats such as stearine.

Vegetable and animal fatty unsaturated oils may be produced in a drastically oxidized condition by means of treatment such as blowing with a suitable gaseous oxidizing medium, e. g., air, oxygen, ozone, or ozonized air. Such oxidation is commonly carried out at ordinary or superatmospheric pressure (up to about 200 pounds per sq. inch), either moist or dry, and in the presence or absence of a catalyst such as lead oleate, cobalt ricinoleate or manganese linoleate or such as alpha pinene or linseed oil, etc. Care should be taken, however, not to permit temperature rise such that excessive pyrolytic decomposition would take place. The oxidation may be vigorous as by violent blowing or may be more gradual as by exposure in thin films to air provided the oxidation is sufficiently prolonged to obtain the desired condition of drastic oxidation. Usually the time required to oxidize the oil is at least about 8 to 10 hours under conditions most favorable to rapid oxidation of the oil, e. g., blowing at relatively high temperature, and for certain fatty bodies much more prolonged oxidation e. g., several days or even weeks is desirable especially under conditions less favorable to rapid oxidation. In any event whether the oxidation is produced by long continued mild oxidation or by more vigorous oxidation, a condition of drastic oxidation is indicated by changes in the chemical and physical attributes of the oil. These changes are usually indicated by a lowered iodine value, an increased saponification value, an increased acetyl value, an increased specific gravity, and an increased refraction index.

Preferably in preparing ester products for use in increasing the dirt removal rate of a filtering medium, a drastically oxidized non-drying or semi-drying unsaturated animal or vegetable fatty oil is directly re-esterified with a polyhydric alcohol, so as to produce a superglycerinated drastically oxidized oil containing a free hydroxyl in the alcohol residue. This can be readily accomplished by heating the polyhydric alcohol and oxidized fatty oil at a temperature above 100° C. for a period of several hours. While a catalyst need not necessarily be employed, the reaction can be facilitated by the use of some catalyst such as sodium carbonate, sodium ricinoleate, or potassium hydroxide.

In referring to re-esterification with a "polyhydric alcohol" reference is made to alcohols containing two or more hydroxyl groups directly attached to an aliphatic group and such alcohols are referred to as aliphatic alcohols. Examples of suitable polyhydric alcohols are glycerol, ethylene glycol, betamethyl glycerol, 1,3, propane diol pentamethylene glycol, alpha, beta, gamma pentantriol, phenyl glycerol, sorbitol, mannitol, sorbitan, mannitan, and the like. Polyhydroxy ether alcohols may also be used such as diglycerol, triglycerol, diethylene glycol, etc., and such as produced by ether formation between two or more polyhydric alcohols, e. g., monoglyceryl ether, 1,3 propanediol monoethylene glycol ether, diethylene glycol monoglycerol ether, etc. Polyhydroxy ether alcohols may also be produced from polyhydric alcohols containing three or more hydroxyls and a monohydric alcohol, examples of such compounds being glycerol monobutyl ether, diglycerol monopropyl ether, etc.

While it is preferred to directly re-esterify an oxidized oil, a suitable esterification product may be made by reacting with a polyhydric alcohol a highly oxidized unsaturated fatty acid derived from a non-drying or semi-drying oil to yield a partial ester containing a hydroxyl group in the alcohol residue. Examples of such fatty acids are castor oil fatty acid, soya bean oil fatty acid, oleic acid, etc. Such acids may be highly oxidized in the manner mentioned above in connection with fatty oils, e. g., by blowing.

Drastically oxidized fatty bodies such as those above described which contain a free hydroxyl in the polyhydric alcohol residue may be readily esterified with a polybasic carboxylic acid. If the acyl-oxy portion of a drastically oxidized fatty body is indicated by the group RCOO, such bodies, which contain one or more free hydroxyls in a polyhydric alcohol residue, may be exemplified by the following:

RCOOC₃H₅(OH)₂
(RCOO)₂C₃H₅OH
RCOOC₂H₄OH
RCOOC₂H₄OC₂H₄OH
(RCOO)₂C₃H₅OC₃H₅OH

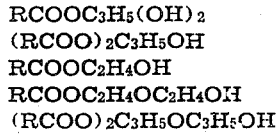

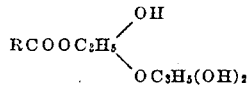

The reaction of the first of the foregoing compounds with phthalic anhydride, for example, illustrates the resulting ester formation and is as follows:

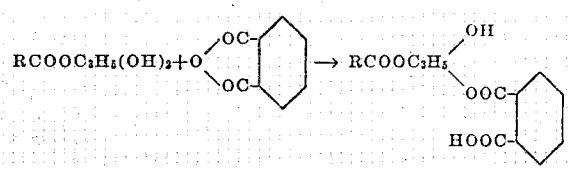

Similarly the other free hydroxyl may be esterified with another molecule of phthalic anhydride. Likewise, similar reactions with any or all of the free hydroxyls of the other compounds listed above may take place to form ester products between a polybasic carboxylic acid and a drastically oxidized fatty body containing a free hydroxyl in a polyhydric alcohol residue.

On the other hand, if a drastically oxidized fatty body does not contain a free hydroxyl in the carboxy hydrogen atom substituent radical, e. g., drastically oxidized oleic acid, then it may be reacted with a polyhydric alcohol to yield a drastically oxidized fatty body containing a free hydroxyl in the carboxy hydrogen atom substituent and suitable for subsequent esterification reaction with a polybasic carboxylic acid. It is also possible to first react a polybasic carboxylic acid with a polyhydric alcohol to yield an ester having one or more free hydroxyls available for subsequent reaction with a drastically oxidized fatty acid. However, the reaction is usually easier to control if the polyhydric alcohol used is first reacted with the drastically oxidized fatty acid or drastically oxidized oil and the fractional ester thus obtained is subsequently reacted with a polybasic carboxy acid. In either case the resulting product is regarded as a product of esterification reaction between an hydroxylated drastically oxidized fatty body and a polybasic carboxylic acid.

When a drastically oxidized oil is subjected to reesterification, it is also possible to perform the reesterification simultaneously with the esterification of the polybasic carboxylic acid. For example, a mixture of a drastically oxidized oil, a polyhydric alcohol and a polybasic carboxylic acid may be mixed and heated together to yield an ester product that may be used to increase the dirt removal rate of filtering media according to this invention.

If the drastically oxidized fatty body contains a free hydroxyl group or the equivalent in the acyl portion thereof, it is not essential that the ester product formed by esterification reaction with a polybasic carboxy acid contain a polyhydric alcohol residue. All the blown oils or acids herein contemplated as reactants contain appreciable and significant hydroxyl values, due to oxidation at an ethylene linkage position. Oxidized oleic acid or oxidized olive oil illustrate this point. Oxidized ricinoleic acid bodies have even a higher hydroxyl value than the parent materials from which they are derived. Since such ricinoleic acid bodies represent the preferred type of reactants, they will be employed to illustrate typical reactions involving an acyl hydroxyl radical. Thus, drastically oxidized ricinoleic acid or a monohydric alcohol ester of drastically oxidized ricinoleic acid may be directly esterified with a polybasic carboxylic acid. The reaction between a drastically oxidized hydroxylated fatty acid and a polybasic carboxylic acid such as phthalic anhydride may be represented as follows:

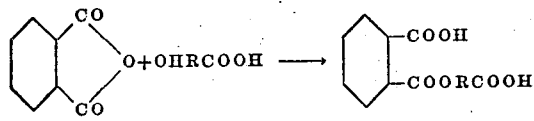

If on the other hand a drastically oxidized hydroxylated fatty acid such as ricinoleic acid is esterified with a polyhydric alcohol, e. g., glycerol, so that there is one or more free hydroxyls in the polyhydric alcohol residue, the polybasic carboxylic acid may esterify with an hydroxyl in the polyhydric alcohol residue or in the acyl group derived from the drastically oxidized fatty acid, or with both, the following being illustrative of typical compounds of the character referred to.

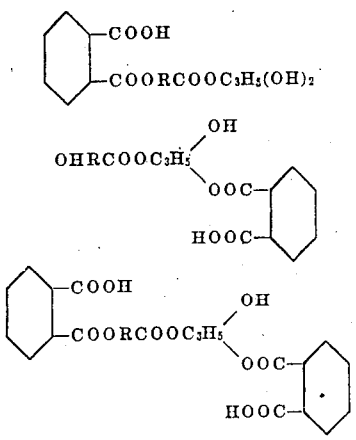

A preferred ester product can be obtained from drastically oxidized castor oil. For preferred results the castor oil should be pale blown castor oil oxidized until it has the following characteristics,

| | |
|---|---|
| Acid number | 15.1 to 25.0 |
| Saponification number | 230.5 to 247.0 |
| Iodine number | 43.5 to 55.0 |
| Acetyl number | 164.0 to 192.0 |
| Hydroxyl number | 188.0 to 220.0 |
| Percent unsaponifiable matter | 1.1 |
| Percent nitrogen | .0 |
| Percent $SO_2$ | .0 |
| Percent ash | Trace |

Pale blown castor oil may be readily esterified with phthalic acid or phthalic anhydride, for example. Thus one mole of pale blown castor oil may be esterified with two moles of phthalic acid or phthalic anhydride by heating the mixed materials at a temperature of approximately 120° to 140° C. for approximately 6 to 12 hours. The reaction can be followed roughly by withdrawing a small sample of the partially reacted mass and permitting it to cool on a watch crystal. When the reaction has become completed no crystals of phthalic anhydride appear. When the sample no longer shows the presence of such crystals on cooling it can be titrated with a standard volumetric alkaline solution so as to indicate that the acid which remains is due to carboxylic hydrogen and not due to phthalic anhydride. If care is taken not to use excessively high temperatures during the esterification reaction so as to cause both carboxyls of the phthalic acid to esterify one can depend upon the standard alkaline solution to indicate the disappearance of the phthalic anhydride. It is not to be inferred, however, that compounds in which both of the carboxylic groups of phthalic acid, for example, become esterified, are not operative.

Where two moles of phthalic anhydride are reacted with drastically oxidized castor oil the esterification reaction may be represented as follows:

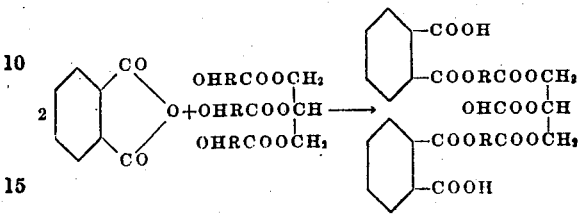

The mono- or tri-phthalated products may also be used.

If desired the drastically oxidized castor oil may be re-esterified with a polyhydric alcohol, e. g., glycerol. In connection with the foregoing example, the pale blown castor oil may be re-esterified with glycerol, e. g., by heating 1 part of commercial glycerine with 5 parts of the drastically oxidized castor oil for about 5 hours at about 200° to 250° C. to obtain a drastically oxidized ricinoleic body which contains free hydroxyl groups located partly in the ricinoleic acyl radical and partly in the glycerol residue. Such superglycerinated material may be readily esterified with a polybasic carboxy acid, e. g. phthalic acid, as described above.

Somewhat more generally, and as illustrated in connection with the foregoing examples, the esterification reactions may be caused to take place readily upon the application of heat, the reaction being more rapid the higher the temperature that is employed, but care should be exercised not to employ excessively high temperatures that would cause decomposition. The reaction may, if desired, be in the presence of an inert solvent, such as xylene, which may be removed after completion of the reaction. When water is produced as a reaction product and the reaction is caused to occur in the presence of a solvent, the reaction may take place under a reflux condenser, using a water-trap to remove the water as it is formed. Water may likewise be removed by passing through the reacting materials a dried inert gas such as nitrogen or $CO_2$. When the polybasic carboxylic acid is in the anhydride form, water is not necessarily split off during the reaction and this facilitates the progress of the reaction and for this reason it is usually preferable to employ the polybasic carboxylic acids in anhydride form. Generally speaking, however, the reactions take place readily and completely by simply heating substances to enter into the reaction in desired stoichiometric proportions at a temperature above the boiling point of water, usually between about 110° and 160° C. provided there is no decomposition. It is apparent that the molecular weight of the resulting ester product may vary widely. The molecular weight of the ester product as determined by cryoscopic methods or from obvious composition of the ester usually runs between about 300 and 4,000 and seldom over 6,000. Ester products having a molecular weight over about 10,000 preferably are not employed.

During esterification reaction there may be some polymerization, especially if the conditions of esterification are prolonged. This polymerization is due primarily to formation of more complicated compounds from monomeric forms through formation of ester linkages with loss of water. It is to be understood that reference to ester products of the character referred to includes possible polymerized forms as well as simple esters or monomers.

As mentioned above, it is possible to produce ester products of the character described wherein each of the carboxyls of the polybasic carboxylic acid becomes esterified, to produce compounds such as

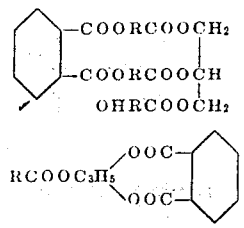

which comprise a closed ring structure heterocyclic in character. While such compounds are operable, it is preferable to carry on the esterification reaction under conditions which are less severe and result in ester compounds containing one or more free carboxyl groups.

In the ester products above referred to, any residual hydroxyl group or carboxyl group constitutes a function that is reactive and that may be left as it is or may occur in some modified form. For example, any residual hydroxyl groups may be left as such, or, if desired, reacted either with additional polybasic carboxy acid or with some monocarboxy acid which may be oxidized or not and which may contain either more or less than 8 carbon atoms.

Referring to residual carboxyl group or groups, such group is preferably left as such, but the acid hydrogen may be replaced by an equivalent. Thus the carboxyl group may be treated with a suitable alkaline material such as caustic soda, caustic potash, ammonium hydroxide, calcium hydroxide, magnesium hydroxide, etc., to form corresponding metallic salts. If desired, the carboxyl group may be reacted with an alkali metal compound (including ammonia) and then converted by metathesis to a salt of a metal such as aluminum, copper, iron, zinc, calcium or magnesium. Amines, such as amylamine, cyclohexylamine, triethanol amine, etc., may also be employed for neutralization. Moreover, the acidic hydrogen may be replaced by a residue of an alcohol (e. g., a mono-, di- or tri-hydric aliphatic alcohol such as ethyl, amyl, glycol, glycerol, or an alicyclic alcohol such as cyclohexanol or an aralkyl alcohol such as benzyl alcohol) to form an ester. Amino-alcohols, such as ethanol amine, triethanolamine, aminoethyl propane diol, aminomethyl propanol, and the like may be employed to replace acidic hydrogens by esterification involving the alcoholic hydroxyl or by simple neutralization. When reference is made to an ester product containing a free carboxyl group, it is intended that the product contain a COOH group in which the acid hydrogen has not been replaced, and such products are preferred. Ester products containing a carboxylic group either in the form of an acid or a salt are likewise regarded as preferable to other products in which the acid hydrogen is replaced by a substituent other than a metal. Where the carboxyl group of a drastically oxidized fatty body is neutralized with an amine, the neutralized product is still regarded as comprising an acyl-oxy group derived from a drastically oxidized fatty acid. It is not necessary to neutralize a carboxyl group of the ester products herein described and ordinarily the additional expense of doing so is not incurred.

While reference has been made to drastically oxidized fatty bodies it is apparent that simple derivatives such as halogenated compounds are functional equivalents. For example, chlorinated ricinoleic acid or chlorinated triricinolein, if drastically oxidized, may be employed. Brominated oleic acid, if drastically oxidized, may also be used. In such instances the drastically oxidized fatty material, notwithstanding modification, still has the same functional properties as the unmodified material and thus acts in the same way as far as esterification reactions of the character herein described are concerned. It is to be understood that the drastically oxidized fatty bodies referred to herein include such functional equivalents. Similarly, modifications of the polybasic carboxylic acid material, e. g. chlorphthalic acid, are suitable.

Some of the ester products above defined are somewhat soluble in oil while others are substantially insoluble. If the ester product is such that only one part or less is soluble (as determined by usual visual methods) in one thousand parts of ordinary straight-run kerosene from Pennsylvania crude, the product is to be regarded as substantially insoluble in oil. For use in increasing the dirt removal rate of filtering media according to this invention, it is preferable that the ester product be substantially insoluble in oil. Most of the ester products hereinabove described are sub-resinous in character and of a tarry or balsam-like consistency. In the case of some of the interacting materials, especially where polyhydroxylated bodies are present, it is possible by prolonged heating at relatively high temperatures to obtain a product that is of a hard horny character and lacks appreciable solubility in oil and in lower aliphatic alcohols. Care should be taken not to produce such hard and totally oil-insoluble bodies. Moreover, if oxidation is carried on for an extremely long time until the fatty body is not only drastically oxidized but also is reduced to a substantially solid state, such compounds are relatively unsuitable. It may be mentioned, however, that even a trace of solubility such as a few parts dissolving in one hundred thousand parts of kerosene of the character above mentioned affords a satisfactory product for increasing the dirt removal rate of filtering media in the practice of this invention.

The production of preferred ester products which are substantially oil-insoluble or of low oil solubility can readily be achieved having in mind the following factors which influence oil solubility of the ester product. Thus oil solubility is decreased when the polybasic carboxylic acid employed in the esterification reaction has a relatively low number of carbon atoms. For example, a product made using phthalic acid will have less oil solubility than a product derived by reaction with naphthalic acid, and a product made using citric acid or maleic acid will have less oil solubility than a product derived by reaction with phthalic acid. However, for most purposes, a single ring polybasic aromatic acid and particularly a dibasic aromatic acid such as phthalic acid is to be preferred. Oil solubility is also affected by the nature of any substituent for the acid hydrogen of a residual carboxyl group in the ester product. Thus the ester product wherein the acid hydrogen is retained has less oil solubility than a product wherein the acid hydrogen is replaced by an alkyl hydrocarbon. For this reason ester products containing an acid carboxylic group are among preferred ester products for use in the practice of this invention. Moreover, from the standpoint of effectiveness in increasing the dirt removal rate of filtering media, it is preferable to have at least one free carboxyl group in the ester product. If the acid hydrogen of a carboxylic group is replaced by an oxy-alkyl group wherein the carbon atoms are separated by at least one oxygen atom, e. g., contains an alkylene oxy group, the oil solubility will be decreased as compared with a product wherein the acid hydrogen of the carboxylic group is replaced by an hydrocarbon alkyl group and such compounds containing an oxyalkyl group are among preferred products for use according to this invention. Oil solubility can also be decreased by selecting a drastically oxidized fatty body that has a relatively low number of carbon atoms. While there are other factors affecting oil solubility, the foregoing discussion is believed to be adequate to enable one to obtain ester products having desired properties of oil solubility. While it is preferable to employ ester products which are substantially insoluble in oil as defined above, those ester products which are more soluble in oil may likewise be employed.

Generally speaking, ester products hereinabove described are substantially water insoluble, namely, are not more soluble than 1 part in 1000 parts of water at 50–80° F. Water insolubility is not particularly important, however, because water in more than very small amounts does not occur in the oil which is used in the lubricating system of an internal combustion engine and which is clarified by a filter. The ester products that are used to increase the dirt removal rate of filtering media in the practice of this invention are preferably totally or substantially insoluble in water.

The products produced as above described which are suitable for increasing the dirt removal rate of filtering media are soluble in one or more of such solvents as lower aliphatic alcohols (ethyl to octyl), carbon tetrachloride, xylene, toluene, etc. This facilitates application of the ester product to filters and to filtering media. Preferably, as aforesaid, the product is prepared so as to be substantially insoluble or of low solubility in oil.

The esterification product above described when used in conjunction with a filter in a filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if the product is applied to a screen or the like through or past which the oil passes before reaching the filtering medium, the dirt removal rate of the medium is increased. If the product is merely introduced into the casing within which the filtering medium is contained, it is effective.

The amount of the product that is used depends upon the increase in dirt removal rate that is desired. Ordinarily, for commercial purposes a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in connection with a filter, a single filter can be made which can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than the untreated filter and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a product of esterification between an hydroxylated drastically oxidized fatty body and a polybasic carboxylic acid, the fatty body being selected from the group consisting of unsaturated non-drying and semi-drying vegetable and animal fatty substances containing 8 to 32 carbon atoms.

2. A filter according to claim 1 wherein said product of esterification contains a free carboxyl group.

3. A filter according to claim 1 wherein said product of esterification contains a carboxylic group wherein the acid hydrogen is replaced by an oxy alkyl group wherein carbon atoms are separated by at least one oxygen atom.

4. A filter according to claim 1 wherein said drastically oxidized fatty body is a drastically oxidized ricinoleic body.

5. A filter according to claim 1 wherein said polybasic carboxylic acid is an aromatic dibasic carboxylic acid.

6. A filter according to claim 1 wherein said esterification product is derivable by reaction between a drastically oxidized ricinoleic body and phthalic acid.

7. A filter according to claim 1 wherein said product of esterification is substantially insoluble in oil.

8. A filter according to claim 1 wherein said product of esterification is substantially insoluble in oil and is substantially insoluble in water.

9. A filter according to claim 1 wherein said product of esterification reaction is a product of esterification reaction involving replacement of an alcoholiform hydroxyl of an acyl radical of the drastically oxidized fatty body.

10. A filter for use in connection with the lubricating system of an internal combustion engine, said filter comprising a casing containing a filtering medium which is sufficiently porous to permit oil to flow therethrough but sufficiently compact to filter out solid particles, said medium having applied thereto as an agent to increase the dirt removal rate of said filtering medium a product of esterification between an hydroxylated drastically oxidized fatty body and a polybasic carboxylic acid, the fatty body being selected from the group consisting of unsaturated non-drying and semi-drying vegetable and animal fatty substances containing 8 to 32 carbon atoms.

11. A filter according to claim 10 wherein said product of esterification is substantially insoluble in oil.

12. A method of increasing the dirt removal rate of a filtering medium for removing dirt from the lubricating oil of an internal combustion engine, said method comprising contacting oil that is filtered by said filtering medium with a product of esterification between an hydroxylated drastically oxidized fatty body and a polybasic carboxylic acid, the fatty body being selected from the group consisting of unsaturated non-drying and semi-drying vegetable and animal fatty substances containing 8 to 32 carbon atoms.

13. A method according to claim 12 wherein said product of esterification contains a free carboxyl group.

14. A method according to claim 12 wherein said product of esterification contains a carboxylic group wherein the acid hydrogen is replaced by an oxy alkyl group wherein carbon atoms are separated by at least one oxygen atom.

15. A method according to claim 12 wherein said drastically oxidized fatty body is a drastically oxidized ricinoleic body.

16. A method according to claim 12 wherein said polybasic carboxylic acid is an aromatic dibasic carboxylic acid.

17. A method according to claim 12 wherein said esterification product is derivable by reaction between a drastically oxidized ricinoleic body and phthalic acid.

18. A method according to claim 12 wherein said product of esterification is substantially insoluble in oil.

19. A method according to claim 12 wherein said product of esterification is substantially insoluble in oil and is substantially insoluble in water.

DONALD H. WELLS.
MELVIN DE GROOTE.